J. A. PERKINS.
THRUST BEARING.
APPLICATION FILED MAY 6, 1913.
1,218,311.                                           Patented Mar. 6, 1917.
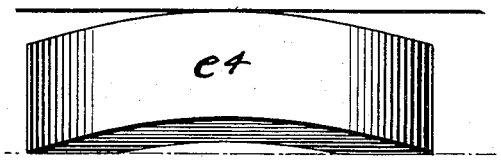
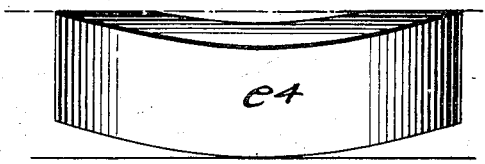
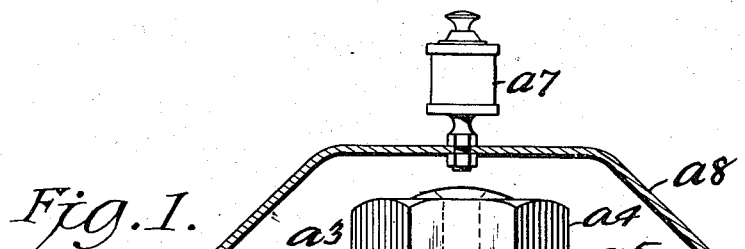
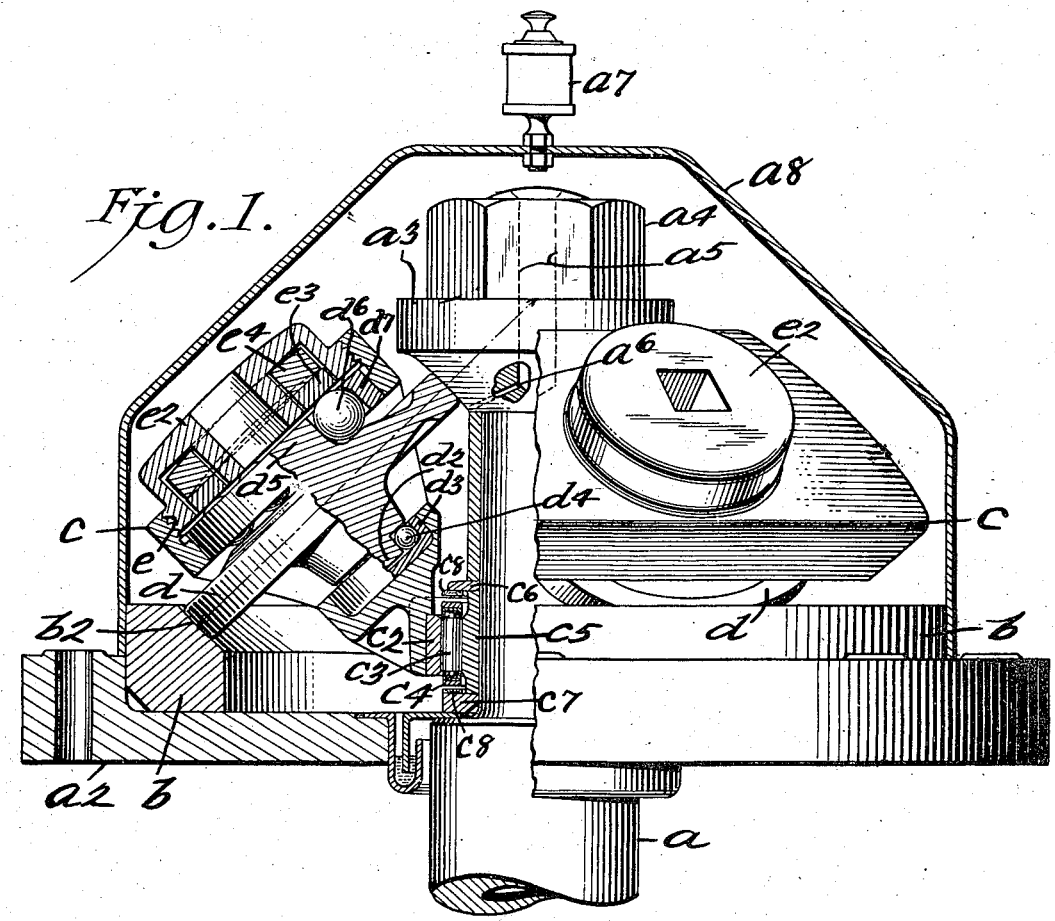

UNITED STATES PATENT OFFICE.

JULIUS A. PERKINS, OF NEW YORK, N. Y.

THRUST-BEARING.

1,218,311.  Specification of Letters Patent.  Patented Mar. 6, 1917.

Application filed May 6, 1913. Serial No. 765,783.

*To all whom it may concern:*

Be it known that I, JULIUS A. PERKINS, a citizen of the United States of America, and residing at New York, in the county of New York and State of New York, have invented certain new and useful Improvements in Thrust-Bearings, of which the following is a specification, such as will enable those skilled in the art to which it appertains to make and use the same.

This invention relates to thrust bearings, with particular reference to the use thereof where very heavy load capacity is desired, and wherein there is great centrifugal strain on the parts, such as in centrifugal machines, electric generators, and the like, and one of the objects is to so construct the same as to be adaptable to extreme requirements and still occupy a relatively small space.

Various types of rollers have been experimented with for such purposes, but none of them has been found equal to balls which, however, are entirely too heavy and cumbersome for bearings of great load capacity as well as too expensive, and I have, therefore, provided rollers which are, in effect, balls, being spherical edged plates, thus maintaining the same load capacity as the balls but materially reducing the space required therefor, and also materially reducing the weight and cost of the bearing and, inasmuch as I may use rollers of this type of relatively great diameter, the speed of rotation thereof with respect to the speed of the supported shaft or equivalent is relatively much slower.

Furthermore, I have found that in high speed machinery the centrifugal action on the rollers requires that anti-frictional thrust bearings be employed on the outer sides thereof to prevent the wear and retardation of operation resulting from a frictional outer bearing for said rollers, and I have also found that a degree of freedom of movement is necessary at these bearing points because of imperfections and inequalities in the parts due to unavoidable inaccurate workmanship, and to overcome this is an important feature of my invention.

I have also found that perfectly true movement of the supported shaft is impossible and I have, therefore arranged my rollers at an angle, between upper and lower bearing members, whereby they are in the line of suspension from the center of shaft suspension to the point of contact of the rollers with the lower bearing member, and I have concaved the inner surface of the lower bearing member on an arc of a circle, the radius of which is the length of a line drawn from the point of suspension of the shaft to the lowest points on the peripheries of the rollers, thus providing, in effect and result, a ball and socket joint between the shaft, and connected rollers, and the lower bearing member which permits considerable lateral play of the lower end of the shaft and avoids the necessity for extreme accuracy of workmanship otherwise unavoidable.

My invention is fully set forth in the following specification, of which the accompanying drawings form a part, in which the separate parts are designated by the same reference characters in each of the views, and in which:—

Figure 1 is a view of a thrust bearing constructed in accordance with my present invention, partly in section, and adapted for a vertical shaft;

Fig. 2 is a side view of an equalizing plate which I employ to compensate for unequal or imperfect operation; and Fig. 3 is a similar view taken at right angles to Fig. 2.

In the drawings forming a part of this application I have shown a shaft $a$ supported, through intermediate parts, by a base $a^2$, said shaft having a collar $a^3$ at the upper end thereof held in position by means of a nut $a^4$, the lower surface of said collar being inclined to the axis of the shaft and also concaved and I may, if desired, bore the shaft longitudinally at its upper end for a predetermined distance, as indicated by dotted lines at $a^5$, which bore is in communication with other bores $a^6$ leading outwardly of the shaft and collar, for lubrication, an oil-cup $a^7$ being arranged directly above the bore $a^5$ on a casing or housing $a^8$ for the operative parts.

Seated upon the base $a^2$ is a ring $b$ having its upper inner edge beveled and concaved, as shown at $b^2$, on an arc of a circle the radius of which is the line struck from the axis of the shaft at whichever point is determined to be the center of shaft suspension to any point of said arc or to any point of said concavity, this being an important feature of my device, as will be later seen.

Arranged about the shaft $a$ is a roller carrying cage $c$ which is maintained in normal relationship therewith by means of a hardened ring $c^2$ at the lower cage end and bearing upon a series of rollers $c^3$ arranged longitudinally of said shaft and carried by a suitable cage $c^4$, said shaft having a hardened sleeve $c^5$ thereon upon which said rollers impinge and having, also, flanges $c^6$ and $c^7$ for confining the roller cage $c^4$, a floating cage controller of relatively soft material being provided at either side of said cage $c^4$, as shown at $c^8$, to take any movement of the cage longitudinally of the shaft in a substantially anti-frictional manner, and the rollers $c^3$ thus insure a positive alining and relationship between the cage $c$ and the shaft $a$.

Carried by the cage $c$ and interposed between the concaved portion of the collar $a^3$ and that of the ring $b$ are a plurality of rollers $d$, each of which is the equivalent of a plate cut from the center of a ball of equal diameter, the radius of the edge of each of which is equal to the radius of the concavity in the lower bearing member $b$, thus presenting a line bearing, instead of a point bearing, of the rollers on the lower bearing member, and providing a spherical edge to each of said rollers and which results in rollers of the full equivalent of balls limited to one direction of movement as to lack of friction and as to load capacity, and I prefer to make the curvature of the bearing portion of the collar $a^3$ on an arc the radius of which is that recognized by manufacturers as standard for balls of given diameters in conventional ball bearings, thus not departing from the advantages of ball bearings in this particular, but I may make the radius of the said arc equal to that of the roller edges and to that of the lower bearing member, thereby presenting a line bearing of the rollers on the upper bearing member also, and it will be noted that the rollers $d$ are arranged in the direct line of suspension of the shaft on the ring $b$, whereby any lateral shaft movement is taken by said ring, through the medium of the rollers $d$, in the nature of a ball and socket joint which insures shaft suspension at all points of the bearing portion $b^2$ of the ring $b$ at all times, and my rollers possess the added advantage of elimination of additional parts and friction of such ball and socket joints.

Each of the rollers $d$ is provided with an inner pintle $d^2$, preferably shouldered as shown, rotating in a hardened cup $d^3$ in the cage $c$, balls $d^4$ being interposed between said pintles and cups to render the connection anti-frictional, and an outer pintle $d^5$ is provided for each of the rollers but of larger transverse diameter than the inner pintles, a series of balls $d^6$ being arranged between each of the pintles $d^5$ and a hardened ball confining ring $d^7$ arranged in a suitable recess in the outer side of the cage $c$.

These recesses in the outer cage surface are internally screw-threaded, as shown at $e$, to receive caps $e^2$ which are recessed on their inner sides for the reception of hardened ball bearing rings $e^3$ and for pressure equalizing plates $e^4$ to distribute and maintain the thrust equally on all of the balls of each series at all times irrespective of structural inequalities of these parts, said plates comprising, in the form shown, rings which are outwardly curved at quadrant points on opposite faces whereby the effect of gimbal rings results, thus permitting sufficient movement of the rings $e^3$ in any direction of strain or load to accommodate the same, together with the balls $d^6$, to any abnormal roller movement otherwise unequal, and the centrifugal action on the balls and rollers is thus taken in a flexible manner; some such equalizing devices are absolutely essential for the reason that perfection of workmanship does not exist, especially in the heavier classes of machinery for which my invention is particularly designed and, the balls in the lower part of the outer bearing of each load carrying roller being farther away from the axis of the shaft than are the balls in the upper part of said bearing, said first named balls are subjected to far greater pressure from centrifugal action than the last named unless some such pressure equalizing and distributing device is employed.

By means of the screw-thread connection between the cage $c$ and the caps $e^2$ any desired adjustment of the parts may be obtained, said caps being externally recessed angularly for a socket wrench, although any other form of cap tightening may be employed, and it will be observed that, because of the high speed of the shaft rotation, the oil is thrown centrifugally over the rollers and over their centrifugal thrust bearings while the shaft is in operation and, when not in operation, the oil drops upon the parts closely adjacent the shaft and adequate lubrication results under all conditions.

The form shown provides for but three rollers, but the number thereof is determined by the requirements and by the sizes of the rollers which are made as large as possible in order to reduce the speed of revolution thereof and I do not limit myself to any specific number of rollers, but gage the number and size thereof to the requirements in space, speed and load.

From the above it will be seen that not only do I provide a thrust bearing capable of very high speed of shaft rotation and of great load capacity, but I also provide means for accommodating the bearing to shaft oscillation because of the flexibility resulting from the concaved formation of the lower bearing member; I also provide a roller bearing cage, means for insuring a constant relationship between shaft and cage, means for taking the roller thrust due to centrifugal action centrifugally, and means for compensating for abnormal roller movement for any cause through the medium of the flexible ball bearings whereby all the balls have the roller thrust distributed equally thereover irrespective of structural inequalities and regardless of the distance of the balls from the shaft which varies the centrifugal action thereon and, because of the relatively large rollers, the speed of roller revolution is correspondingly slower than is that of the shaft, resulting in slower cage revolution and consequent lessened centrifugal action on the rollers and their bearings, and I also provide a controllable system of lubrication for all the parts.

My bearing is simple in construction and in assembling or disassembling for the reason that my rollers, cage, roller thrust bearings, and connected parts are a unit, thus saving much time in installation and obviating the possibility of faulty assembling by careless or unskilled workmen, but still permitting adjustment of the parts when necessary by means of the nut $a^4$ for the rollers between bearings, and by means of the caps $e^9$ for the roller thrust bearings, it being necessary to make such adjustments at times, particularly in new bearings after the parts have become well settled and accommodated, one to the other.

Having fully set forth my invention, what I claim as new, and desire to secure by Letters Patent, is:—

The combination with a rotating element of a curved bearing member carried thereby, a base, a curved bearing member carried by said base, a plurality of rollers interposed between said bearing members, a cage for said rollers, a cap on said cage on the axis of each roller, a bearing ring in each cap, a plurality of balls interposed between each roller and each bearing ring, and an equalizing plate interposed between each cap and the respective bearing ring, each face of said equalizing plate being outwardly curved at diametrically opposed points, and the curved portions on one face being at right angles to those on the other face.

In testimony that I claim the foregoing as my invention I have signed my name in presence of the subscribing witnesses this 5th day of May 1913.

JULIUS A. PERKINS.

Witnesses:
WILLIAM A. BOECKEL,
J. C. LARSEN.